United States Patent
Kawashima et al.

(10) Patent No.: US 6,784,948 B2
(45) Date of Patent: Aug. 31, 2004

(54) TOUCH PANEL FOR DISPLAY DEVICE WITH PET FILM HAVING TRANSPARENT GEL LAYER

(75) Inventors: Satoshi Kawashima, Shizuoka-ken (JP); Katsuji Ishigami, Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 252 days.

(21) Appl. No.: 10/191,489

(22) Filed: Jul. 10, 2002

(65) Prior Publication Data

US 2003/0011720 A1 Jan. 16, 2003

(30) Foreign Application Priority Data

Jul. 13, 2001 (JP) ........................................ 2001-213731
Jan. 23, 2002 (JP) ........................................ 2002-014420

(51) Int. Cl.⁷ ..................... G02F 1/133; G02F 1/1335; G09G 3/36; G09G 5/00; G06K 11/16
(52) U.S. Cl. ..................... 349/12; 349/62; 345/104; 345/173; 178/18.05
(58) Field of Search ..................... 349/12, 62; 345/104, 345/173; 178/18.05

(56) References Cited

U.S. PATENT DOCUMENTS 5,907,375 A * 5/1999 Nishikawa et al. ........... 349/12
6,130,658 A * 10/2000 Yamamoto et al. ......... 345/102
6,456,279 B1 * 9/2002 Kubo et al. ................. 345/173
6,639,163 B2 * 10/2003 Fukui et al. ................. 200/512

FOREIGN PATENT DOCUMENTS

JP 2000-187197 7/2000

* cited by examiner

Primary Examiner—Robert H. Kim
Assistant Examiner—Hoan C. Nguyen
(74) Attorney, Agent, or Firm—Nath & Associates PLLC; Gary M. Nath

(57) ABSTRACT

A touch panel has a reduced whole thickness when attached to a display device, increases the accuracy of the positional information, and improves the display quality and durability inexpensively. One of a pair of resistive layers facing each other across insulating dot spacers is laid on a light-transmissible flat plate formed of a PET film rather than a glass plate, and a light conductive plate of a front light unit is integrated with an outer surface of the light-transmissible flat plate. An AR film having a transparent gel layer is disposed between the PET film and the light conductive plate. The transparent gel layer is of a gel material such as silicone rubber and is applied integrally on the AR film, which is formed such that anti-reflection treatment is applied on a surface of a base material of a FET film.

10 Claims, 3 Drawing Sheets

TOUCH PANEL FOR DISPLAY DEVICE WITH PET FILM HAVING TRANSPARENT GEL LAYER

BACKGROUND OF THE INVENTION

1. Field of the Invention

The present invention relates to a touch panel for a display device, which is disposed close to a display surface of a display device, such as a liquid crystal display device, and which outputs a predetermined signal corresponding to a position at which an operator presses on a panel surface with a pen or a finger based on information displayed on the display surface.

2. Description of the Related Art

Since, in this type of touch panel, an area corresponding to the display surface of the display device can be used for both displaying and inputting information, the utilization factor of the area is increased, and therefore the touch panel is increasingly demanded for compact information processors and communications equipments, in particular, mobile communications terminals.

FIG. 2 is a sectional view of a conventional touch panel (disclosed in FIG. 2 of Japanese Patent Laid-open No. 2000-187197 A).

As shown in FIG. 2, a touch panel 10A is basically composed of a pair of resistive layers (first and second resistive layers) 12 and 13 disposed opposite to each other across a plurality of insulating dot spacers 11, and a light-transmissible flat plate, for example, a transparent glass plate 16, for protecting the second resistive layer 13 which is laid on the glass plate 16. The touch panel 10A is disposed close to a display device 30 such that the glass plate 16 faces toward the display surface of the display device 30.

In this construction, when the outer surface of the first resistive layer 12 is touched to be pressed, a touched portion of the first resistive layer 12 is brought into contact with a portion of the second resistive layer 13 opposite thereto, and a signal corresponding to the contact position (touched position) is generated.

In a practical construction, a transparent layer, for example, a polyethylene terephthalate (hereinafter referred to as PET) film 15, is laminated on the outer surface of the first resistive layer 12 for protection thereof, so the touching operation is implemented on this PET film 15.

The first and second resistive layers 12 and 13 are combined at their peripheries by means of a sealing member 14 to be dustproof and waterproof.

A light unit is added to the display device 30 to illuminate the display surface brightly for easier observation. A front light unit 20 to shed light on the front face (display surface) of the display device 30 is often used as the light unit in recent years.

In FIG. 2, the touch panel 10A is attached to the display device 30 having the front light unit 20 described above. The front light unit 20 comprises a light source 21 and a light conductive plate 22 disposed facing the display surface of the display device 30 and adapted to guide light emitted from the light source 21 located at an end of the light conductive plate 22 toward the display surface of the display device 30. Light made incident on the display surface is reflected thereat or inside of the display device 30, travels through the light conductive plate 22 and the touch panel 10A, and exits out (refer to an arrow indicated by a broken line in the figure), whereby an image on the display surface is visualized.

The light conductive plate 22 has an array of prisms, whose respective ridges are parallel to one another, formed on a surface thereof opposite to a surface facing toward the display device 30, thereby guiding light, which has come into the light conductive plate 22 through its end face, toward the display surface of the display device 30.

However, in the conventional structure shown in FIG. 2, since the touch panel 10A and the front light unit 20 are constituted discretely from each other, the touch panel 10A is handled individually and easily subjected to vibration and shock during transportation or assembly. And also the touch panel 10A is required to be strong enough against vibration and shock even after mounted on the device body. Therefore, the glass plate 16 is increased in thickness so as to reinforce the touch panel 10A and also to prevent itself from getting damages. However, this gives a disadvantage that the display device 30 has its whole thickness D increased when attached to the touch panel 10A, and also a problem that since the light conductive plate 22 is brought into direct contact with the glass plate 16, the light conductive plate 22 may be damaged or broken by the glass plate 16 when vibration or shock is applied to the touch panel 10A.

Accordingly, a touch panel for a display device (as shown in FIG. 1 of the above-described Japanese Patent Laid-open) was disclosed, where, as shown in FIG. 3, a second resistive layer 13 of a touch panel 10B is in close contact with a surface of a light conductive plate 22, on which an array of prisms are formed.

In this touch panel, a member (the glass plate 16 in FIG. 2) interposed between the light conductive plate 22 and the second resistive layer 13 of the touch panel 10B is eliminated, and the touch panel 10B is integrated with a front light unit 20, and thus the whole thickness D can be reduced when the touch panel and the front light unit are attached to a display device 30. Further, the glass plate 16 in FIG. 2 is not present, and this solves the problem that the light conductive plate 22 is damaged or broken by the glass plate 16 when vibration or shock is applied to the touch panel 10B.

Furthermore, the present inventors proposed countermeasures to overcome the problems of the touch panel disclosed in FIG. 2 of the above-mentioned Japanese Patent Laid-open, and disclosed the details thereof in Japanese Patent Application No. 2000-387641 that was filed on Dec. 20, 2000 and has not been open to the public (therefore, the related invention in the Japanese Patent Application does not constitute prior art under 35 U.S.C. §102). In short, as shown in FIG. 4, a layer of a transparent gel material with a low refractive index 17 (17b) is disposed between a glass plate 16 and a light conductive plate 22, whereby vibration or shock applied to a touch panel 10C can be absorbed, the glass plate 16 can be made thinner, and visibility of reflected light from a display device 30 can be secured. In addition, as shown in FIG. 5, a touch panel 10D is also disclosed in which a layer of a transparent gel material 17 (17c) and a transparent film 19 made of a material with a low refractive index are disposed between a glass plate 16 and a light conductive plate 22 thereby obtaining a similar advantage.

However, there is a problem described below in the conventional touch panel shown in FIG. 3.

Since the second resistive layer 13 is in close contact with the surface of the light conductive plate 22, on which the array of prisms are formed, as described above, the second resistive layer 13 is uneven corresponding to the surface of the array of prisms, and insulating dot spacers 11 are interposed between the uneven second resistive layer 13 and a flat first resistive layer 12.

Accordingly, it becomes difficult to secure the linearity of resistance value at each position on a touch panel operation surface (the PET film 15), and errors occur easily in positional information obtained.

In addition, this makes it difficult to dispose individual insulating dot spacers 11 with an even height on the second resistive layer 13, whereby the PET film 15 constituting the touch panel operation surface tends to undulate deteriorating display quality.

Furthermore, this gives a problem that, with a long term use, protrusions on the array of prisms of the light conductive plate 22 and protrusions on the second resistive layer 13 covering the light conductive plate 22 are liable to damages, resulting in inferior durability.

Still furthermore, in the touch panels shown in FIGS. 4 and 5, the transparent gel material 17 (17*b*) with a low refractive index and the transparent film 19 made of a material with a low refractive index have not been so fully developed as to be adapted for mass-production yet. As a result, to date, the touch panels have not been introduced on the market inexpensively and massively.

In addition, a problem is pointed out that light, which is directed toward the display device 30, reflected at the display surface or inside thereof, and supposed to pass through the light conductive plate 22 and the touch panel 10C or 10D to finally exit out, is reflected at the glass plate 16, thereby diminishing an amount of light exiting outside, and resultingly deteriorating the visibility of the display surface of the display device 30.

SUMMARY OF THE INVENTION

The present invention is made to overcome these problems in the aforementioned touch panels, and its object is to provide, inexpensively in a large quantity, a touch panel for display device, which combines the advantages of each of the touch panels shown in FIGS. 2 to 5. Specifically, the touch panel is structured such that the whole thickness is not increased substantially when attached to the display device, the light conductive plate is not damaged by the light-transmissible flat plate when subjected to vibration, errors do not come out in obtained positional information, the operation surface does not undulate, the display quality does not deteriorate, and that the durability is excellent.

Another object of the present invention is to effectively inhibit light, which is reflected at the display surface or inside of the display device, from being reflected at the touch panel, thereby preventing the visibility of the display surface from deteriorating.

In order to solve the above problems, a first aspect of the present invention provides a touch panel for a display device, which is structured such that one of a pair of resistive layers disposed so as to face each other and to sandwich a plurality of insulating dot spacers is laid on a light-transmissible flat plate formed of a PET film, which is disposed close to a display device such that the light-transmissible flat plate faces toward a display surface of the display device and that a front light unit comprising a light source and a light conductive plate to guide light emitted from the light source toward the display surface of the display device is interposed between the light-transmissible flat plate and the display device, and in which an outer surface of the other resistive layer of the pair is touched to be pressed thereby generating a signal corresponding to a position touched, wherein a transparent cushioning member composed of a shock-absorbing layer and a base layer for supporting the shock-absorbing layer is disposed between the light conductive plate and the light-transmissible flat plate.

According to a second aspect of the present invention, in the touch panel of the first aspect, the cushioning member is a PET film having a transparent gel layer.

According to a third and fourth aspects of the present invention, in the touch panel of the second aspect, the PET film is an anti-reflection (AR) film and a low reflection (LR) film, respectively.

According to a fifth and sixth aspect of the present invention, in the touch panel of the first aspect, the cushioning member is structured such that a liquid or gel cushioning material is applied on the touch panel and that a surface of the cushioning material is hardened to eliminate stickiness thereby constituting a base layer.

According to a seventh aspect of the present invention, in the touch panel of the first to sixth aspects, the base layer has a thickness of 10 to 500 $\mu$m.

According to an eighth aspect of the present invention, in the touch panel of the first to seventh aspects, the shock-absorbing layer has a thickness of 50 to 500 $\mu$m.

According to a ninth aspect of the present invention, in the touch panel of the first to eighth aspects, a gap of 10 $\mu$m to 1 mm is provided between the cushioning member and the light conductive plate.

According to a tenth aspect of the present invention, in the touch panel of the first to eighth aspects, the cushioning member is in contact with the light conductive plate.

BRIEF DESCRIPTION OF THE DRAWINGS

The invention is described with reference to the drawings, which are presented for the purpose of illustration only and do not limit the scope of the invention.

DESCRIPTION OF THE PREFERRED EMBODIMENTS

Figure 1A:
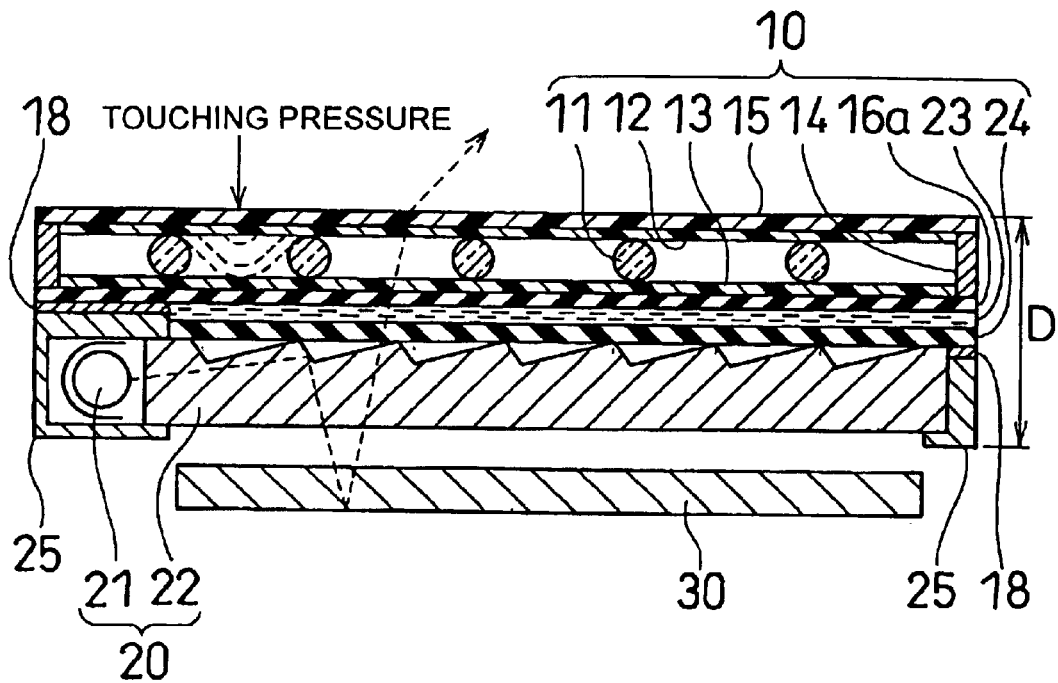
FIGS. 1A and 1B are sectional views showing embodiments of a touch panel for display devices of the present invention.

Embodiments of the present invention will be explained with reference to the drawings. Elements equivalent to those of the conventional touch panel are given the same reference numerals, and detailed explanations thereof are omitted.

Figure 1B:
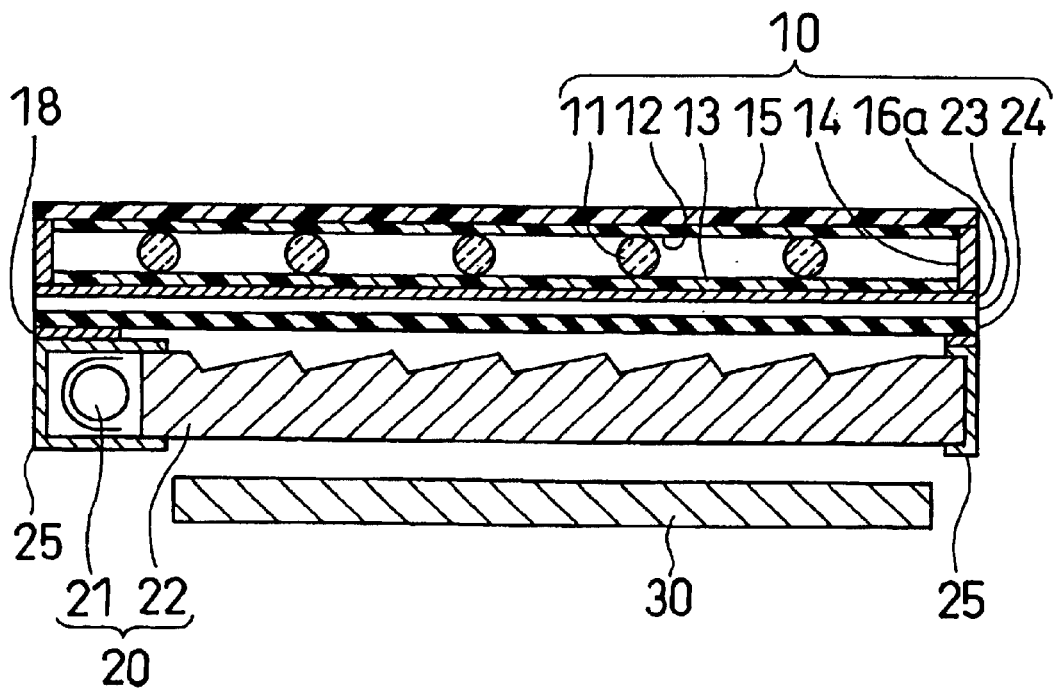

Referring to FIG. 1A or 1B, a touch panel 10 according to one embodiment of the present invention is basically composed of a pair of resistive layers (first and second resistive layers 12 and 13), for example ITO films, disposed to face each other, with a plurality of insulating dot spacers 11 interposed therebetween, and a light-transmissible flat plate (hereinafter referred to as PET film, which is used in the present invention) 16*a* for protecting the second resistive layer 13. The second resistive layer 13 is formed on the PET film 16*a*. The touch panel 10 is disposed close to a display device 30 such that the PET film 16*a* is directed toward a display surface of the display device 30. The light-transmissible flat plate is not limited to PET film, and may be of any materials having light-transmissibility and flexibility.

Furthermore, an AR film 24 is disposed under the PET film 16a, that is, toward the display device 30, and a transparent gel layer 23 is sandwiched therebetween. The transparent gel layer 23 is of a transparent gel substance, such as silicone resin, and integrated with the AR film 24 such that the transparent gel layer 23 is coated on the AR film 24. Furthermore, in this embodiment, the AR film 24 is formed such that an anti-reflection treatment is applied on a surface of a PET film substrate. The transparent gel layer 23 functions as a shock absorber and the AR film 24 braces the transparent gel layer 23. The transparent gel layer 23 and the AR film constitute a cushioning member that is discrete from a light conductive plate 22, which gives a favorable effect with regard to refractive index to be described hereinlater.

As the transparent gel layer 23 is sticky, the AR film 24 is disposed so as to have close contact with the PET film 16a via the transparent gel layer 23, thereby making the PET film 16a and the AR film 24 dustproof and waterproof.

In such a configuration, when the outer surface of the first resistive layer 12 is touched to be pressed, the touched portion comes into contact with a portion of the second resistive layer 13 opposite thereto, and a signal corresponding to the contacted portion is generated.

Actually, a transparent layer, a PET film 15 in this case, for protecting the resistive layer 12 is laminated on the outer surface of the first resistive layer 12. Accordingly, the touching operation is implemented on this PET film 15.

The first and second resistive layers 12 and 13 are combined at their peripheries by a sealing member 14 to be dustproof and waterproof.

In addition, in the present invention, the light conductive plate 22, which, together with a light source 21, constitutes a front light unit 20, and guides light emitted from the light source 21 toward the display surface of the display device 30, is integrally attached on the outer surface of the AR film 24.

The touch panel 10 and the front light unit 20 are integrated, as shown in FIG. 1A, by means of a binding material 18, such as a double sided tape or resin. The binding material 18 combines a housing frame 25 for holding together the light conductive plate 22, the light source 21 and so on, with the AR film 24 at their peripheries. This binding material 18 also plays the role of waterproofing and dustproofing the space between the AR film 24 and the light conductive plate 22.

Accordingly, the touch panel 10 according to this embodiment of the present invention is structured such that the PET film 15, the first and second resistive layers 12 and 13 which are disposed to face each other across the plurality of insulating dot spacers 11, the PET film 16a (the light-transmissible flat plate), the transparent gel layer 23, and the AR film 24 are integrated in this order.

An array of prisms whose respective ridges are parallel to one another are formed on a surface of the light conductive plate 22 opposite to a surface facing toward the display device 30 so that light emitted from the light source 21 can travel toward the display surface of the display device 30.

In order to direct (reflect) the light emitted by the light source 21 toward the display surface of the display device 30 by means of the light conductive plate 22, the relationship: $n1>n2$ must be satisfied, where n1 is the refractive index of the light conductive plate 22 and n2 is the refractive index of a medium in contact with the prisms.

Figure 2:
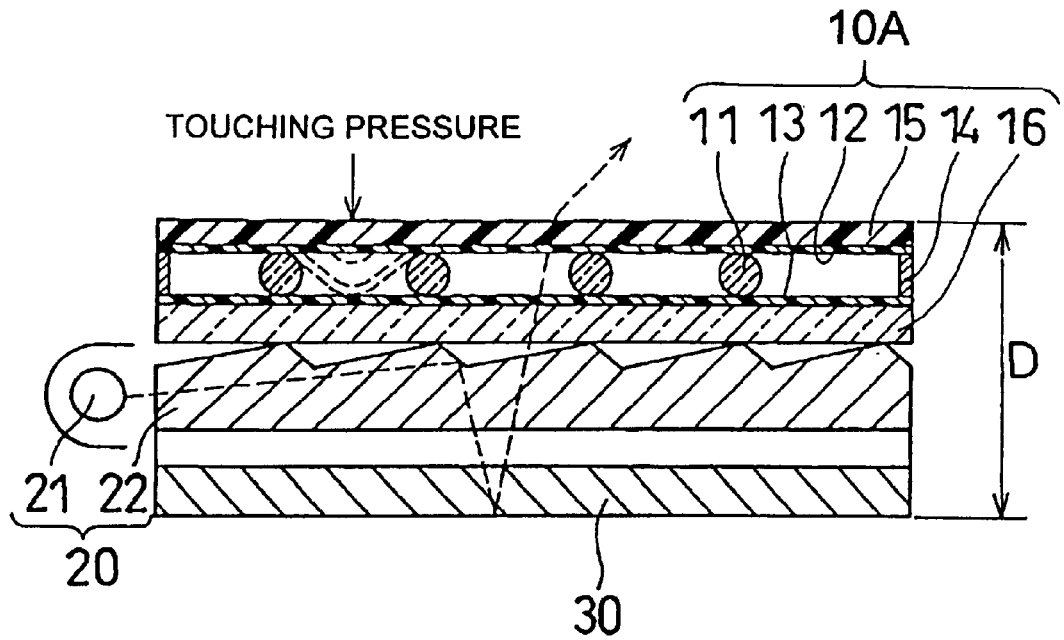
FIG. 2 is a sectional view showing a conventional touch panel.

In this embodiment, the light conductive plate 22 is formed of, for example a transparent acrylic resin and has a refractive index (n1) of about 1.5, and the medium is air just like in the conventional touch panel shown in FIG. 2 and has a refractive index (n2) of 1. Thus, the above-mentioned relationship ($n1>n2$) is satisfied.

Accordingly, light emitted from the light source 21 passes through the light conductive plate 22, and is reflected at the array of prisms toward the display surface of the display device 30, and thereby the display surface is illuminated. Light having reached the display device 30 is reflected at its display surface or inside, passes through the light conductive plate 22, a layer of air present between the light conductive plate 22 and the PET film 24, and the touch panel 10, and exits out (refer to an arrow indicated by a broken line in the figure). Thus, an image on the display surface is visualized.

Various coatings are optionally applied on the PET film 16a or the AR film 24 when required to improve their properties. For example, hard coating may be applied on the AR film 24, thereby providing the surface of the AR film 24 with a certain degree of hardness for scratchproofing.

According to the touch panel described above, the light-transmissible flat plate is formed of the PET film 16a which is flexible, excellent in vibration and shock resistance, and accepts various coatings. As a result, the light-transmissible flat plate can be made thinner than the conventional one (glass plate). In addition, due to the mechanical property of the transparent gel layer 23 and the AR film 24 which are disposed between the light conductive plate 22 and the PET film 16a, vibration or shock applied to the touch panel 10 is transmitted with attenuation to the light conductive plate 22.

The AR film for bracing the transparent gel layer 23, when set to have a thickness of 10 to 500 $\mu$m, preferably 10 to 100 $\mu$m, obtains necessary flexibility, and works to disperse force generated when the touch panel 10 hits against the light conductive plate 22, thereby effectively preventing damages to the touch panel 10 and the light conductive plate 22.

It is found that the transparent gel layer 23, when set to have a thickness of about 50 to 500 $\mu$m, preferably 50 to 200 $\mu$m, depending on the characteristics thereof, can provide significant cushioning effect with little influence on the whole thickness of the touch panel.

Furthermore, according to the related art touch panel (FIG. 4), a transparent gel substance 17 (17b) is in direct contact with a light conductive plate 22. As a result, it is necessary to use a gel material having a low refractive index. However, according to the present invention, the transparent gel layer 23 is disposed between the PET film 16a and the AR film 24, and therefore does not come into contact with the light conductive plate 22, so the refractive index of the transparent gel substance does not constitute restriction when selecting the kind of gel substance.

In FIG. 1A, the AR film 24 is in contact with ridges of the prisms formed on the light conductive plate 22. This can minimize the whole thickness D when the touch panel 10 is attached to the front light unit 20. It may alternatively be that the AR film 24 is in contact partly with the ridges of the prisms (not illustrated). In another example shown in FIG. 1B, an AR film 24 is apart from ridges of prisms formed on a light conductive plate 22. When a gap between the AR film 24 and the light conductive plate 22 is set to 10 $\mu$m to 1 mm, damages to the touch panel 10 and the light conductive plate 22 can be surely prevented, thereby achieving a longer life of the product.

Furthermore, the AR film 24, which is disposed integrally with the transparent gel layer 23 between the light conductive plate 22 and the PET film 16a, eliminates effectively the problem that light, which is reflected toward the display device 30, made incident thereon, reflected at the display surface or inside thereof, and which passes through the light conductive plate 22 and the touch panel 10, is reflected at the PET film 16a failing to exit out the touch panel 10. As a result, deterioration in visibility of the display surface of the display device 30, which is caused due to reduced amount of light exiting out, can be prevented.

When such an anti-reflection function is performed by other means than the AR film 24, a plain PET film having a surface without anti-reflection treatment may replace the AR film 24. Furthermore, the AR film 24 may be replaced by an LR (Low Reflection) film which is relatively inexpensive and exhibits anti-reflection characteristics.

The transparent gel layer 23 and the AR film integrated therewith may be replaced by a structure formed such that a liquid or gel cushioning material is coated on the surface of the PET film 16a facing toward the display device 30 and that the surface of the coating of the liquid or gel cushioning material is hardened thereby eliminating its stickiness. With this structure, vibration or shock applied to the touch panel 10 accidentally or by touching pressure during touching operation is transmitted with attenuation to the light conductive plate 22 due to mechanical properties of the liquid or gel cushioning material. And the hardened surface of the coating of the liquid or gel cushioning material works to brace a portion thereof which remains intact without hardening to work as a shock-absorbing layer. This alternative structure corresponds to the structure integrally constituted by the transparent gel layer 23 and the AR film 24 as shown in FIGS. 1A and 1B, and therefore can be handled safely without difficulty.

Figure 3:
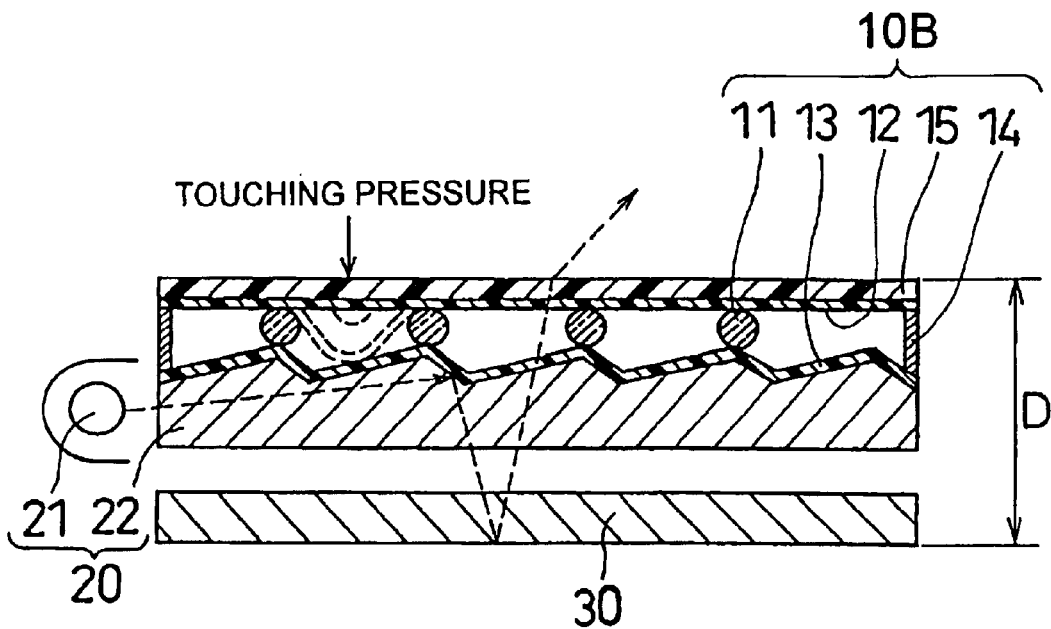
FIG. 3 is a sectional view showing a conventional touch panel in which a second resistive layer is disposed in close contact with a surface of a light conductive plate of a front light unit.

The touch panel of the present invention, configured as described above, realizes the following effects. Firstly, the touch panel of the first aspect is configured basically similar to the conventional touch panel shown in FIG. 2 where one of a pair of resistive layers disposed so as to face each other across insulating dot spacers is laid on the light-transmissible flat plate, and therefore retains the advantages of the conventional touch panel in FIG. 2 and at the same time overcomes the problems associated with another conventional touch panel in FIG. 3. Specifically, since the resistive layer that is pressed by the insulating dot spacers is formed on the light-transmissible flat plate (PET film), the linearity of resistance values at individual positions on the operational surface of the touch panel can be sufficiently secured, and the accuracy of the positional information to be obtained is not deteriorated.

In addition, since the individual insulating dot spacers can be easily arranged with an even height on the second resistive layer, the transparent film (PET film or the like) as the operational surface of the touch panel does not undulate, and the display quality is not deteriorated.

Furthermore, since the insulating dot spacers are pressed against the inner surface of the resistive layer formed on the light-transmissible flat plate, that is, against a flat surface, the light conductive plate and the second resistive layer do not suffer damages thereby improving the durability.

In the present invention, since the light conductive plate of the front light unit is attached integrally with the outer surface of the light-transmissible flat plate formed of a PET film, the touch panel does not require such a large mechanical strength against vibration and shock in transportation as conventionally required. In addition, the PET film itself is flexible, excellent in vibration and shock resistance, and accepts various kinds of coatings.

As a result, the thickness of the PET film as the light-transmissible flat plate can be reduced to about one half to one quarter of about 0.4 mm which is the thickness of the conventional glass plate. Thus, when the touch panel and the front light unit are attached to the display device, the whole thickness D can be made smaller than conventionally, whereby the problems with the conventional touch panel shown in FIG. 2 can be eliminated. In addition, the PET film is not damaged by the light conductive plate.

Furthermore, since the light conductive plate is not so hard as the glass plate, and since the PET film is lighter than the glass plate, the light conductive plate is no longer damaged or destroyed when the touch panel is subjected to vibration or shock.

Figure 4:
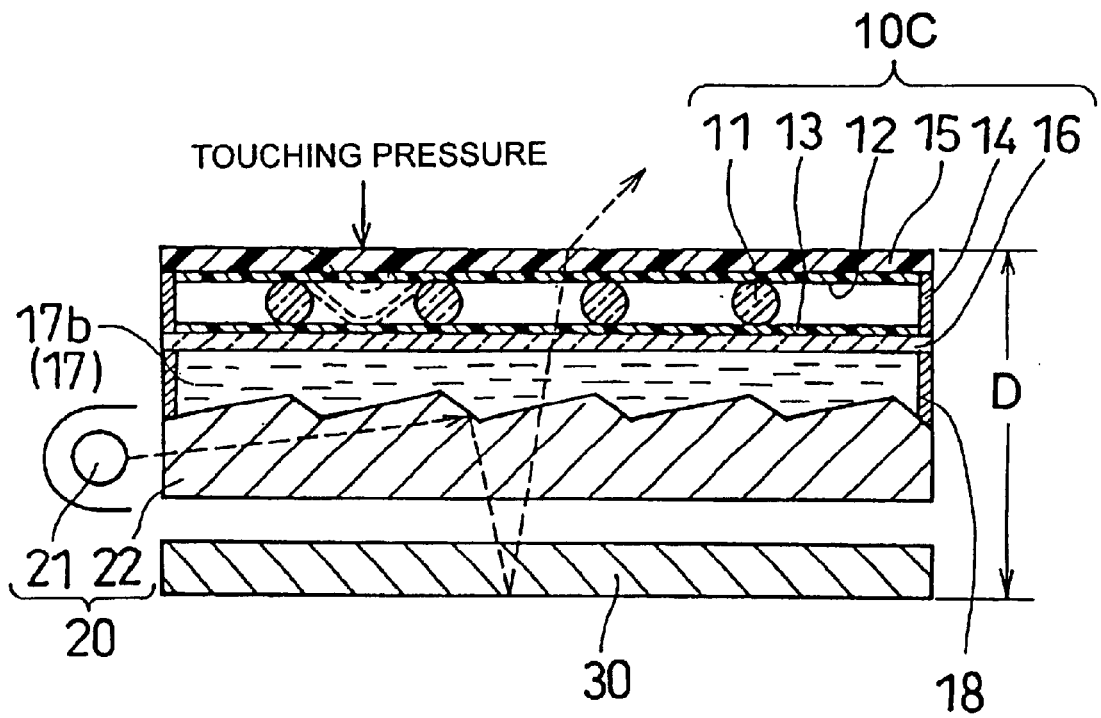
FIG. 4 is a sectional view of a related art touch panel in which a glass plate of its constituent elements is made thinner.
Figure 5:
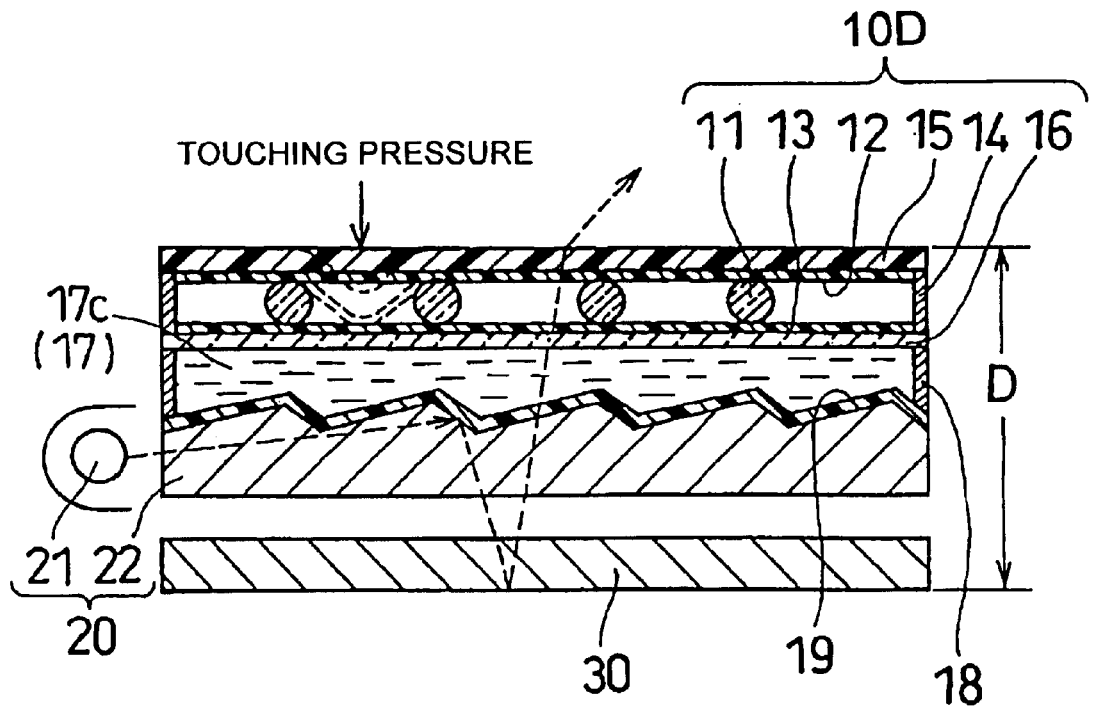
FIG. 5 is a sectional view showing another related art touch panel in which a glass plate of its constituent elements is made thinner.

In addition, since the medium in contact with the array of prisms on the light conductive plate is air as in the conventional touch panel shown in FIG. 2 so as to satisfy the relationship: n1>n2 where n1 is the refractive index of the light conductive plate and n2 is the refractive index of the medium, it is not necessary to use transparent gel materials with a low refractive index or films formed of a transparent material with a low refractive index, which are used in the related art touch panels shown in FIG. 4 and FIG. 5. Accordingly, the touch panel can be supplied at low costs and in large quantities.

Further, due to the mechanical properties of the shock-absorbing layer of the transparent cushioning member interposed between the light conductive plate and the light-transmissible flat plate and being discrete from the light conductive plate, vibration and shock applied accidentally to the touch panel during touching operation is transmitted with attenuation to the light conductive plate. Therefore, the touch panel is free from damages to the light conductive plate, and therefore is excellent in durability and can be fabricated at low costs and in large quantities.

According to the second aspect of the present invention, due to the mechanical properties of the transparent gel layer and the PET film which are interposed between the light conductive plate and the light-transmissible flat plate, vibration or shock applied to the touch panel is transmitted with attenuation to the light conductive plate. Thus, the touch panel has the advantages of each of the touch panels shown in FIGS. 2 to 5. Specifically, the touch panel does not have its whole thickness increased substantially when attached to a display device, and the light conductive plate is not damaged by the light-transmissible flat plate when the touch panel is subjected to vibration or shock, errors in positional information are not caused, the touching operation surface does not undulate, and the display quality does not deteriorate. Further, the touch panel having the above advantages can be fabricated at low costs and in large quantities.

According to the third or fourth aspect of the present invention, it is prevented by means of the AR film or the LR film interposed between the light conductive plate and the PET film, that light, which is directed toward the display device, reflected at the display surface or inside thereof, and passes through the light conductive plate and the touch panel to finally exit out, is reflected by the touch panel at the PET film side failing to exit out. As a result, deterioration in visibility of the display surface of the display device due to a reduced amount of light exiting out can be suppressed.

According to the fifth or sixth aspect of the present invention, due to the mechanical properties of the liquid or gel shock-absorbing material applied on the surface of the touch panel, vibration and shock applied to the touch panel is transmitted with attenuation to the light conductive plate. Therefore, deterioration in performance due to damages to the light conductive plate can be prevented. And the surface of the shock-absorbing material is hardened so as to take away stickiness thereby constituting a base layer, and therefore can be handled just like the PET film having a transparent gel layer.

According to the seventh aspect of the present invention, the base layer has necessary flexibility, and can disperse the stress generated when the touch panel comes into contact with the light conductive plate, thereby effectively preventing damages to the touch panel. Thus, the touch panel can be prevented from deteriorating in performance due to damages to the light conductive plate.

According to the eighth aspect of the present invention, the shock-absorbing layer can provide significant cushioning effect with little influence on the whole thickness of the touch panel. Therefore, the touch panel can be produced with a smaller size and a lower profile and without deterioration in performance due to damages to the light conductive member.

According to the ninth aspect of the present invention, the gap provided between the cushioning member and the light conductive plate can surely prevent damages to the touch panel and the light conductive plate, thereby preventing deterioration in performance due to damages to the light conductive plate.

According to the tenth aspect of the present invention, the touch panel can minimize the whole thickness when equipped with the front light unit, and provide significant cushioning effect as well. Therefore, the touch panel can be produced with a smaller size and a lower profile, and at the same time prevent deterioration in performance due to damages to the light conductive plate.

It is to be understood that the invention is not restricted to the particular embodiments set forth herein as illustrated, but embraces all such modified forms thereof that come within the scope of the following claims.

What is claimed is:

1. A touch panel for a display device: which is structured such that one of a pair of resistive layers disposed so as to face each other and to sandwich a plurality of insulating dot spacers is laid on a light-transmissible flat plate formed of a polyethylene terephthalate film; which is disposed close to a display device such that the light-transmissible flat plate faces toward a display surface of the display device and that a front light unit comprising a light source and a light conductive plate to guide light emitted from the light source toward the display surface of the display device is interposed between the light-transmissible flat plate and the display device; and in which an outer surface of the other resistive layer of the pair is touched to be pressed thereby generating a signal corresponding to a position touched, wherein a transparent cushioning member composed of a shock-absorbing layer and a base layer for bracing the shock-absorbing layer is disposed between the light conductive plate and the light-transmissible flat plate.

2. A touch panel according to claim 1, wherein the cushioning member is a polyethylene terephthalate film having a transparent gel layer.

3. A touch panel according to claim 2, wherein the polyethylene terephthalate film is an anti-reflection film.

4. A touch panel according to claim 2, wherein the polyethylene terephthalate film is a low reflection film.

5. A touch panel according to claim 1, wherein the cushioning member is structured such that a liquid cushioning material is applied on the touch panel and that a surface of the cushioning material is hardened so as to eliminate stickiness thereby constituting the base layer.

6. A touch panel according to claim 1, wherein the cushioning member is structured such that a gel cushioning material is applied on the touch panel and that a surface of the cushioning material is hardened so as to eliminate stickiness thereby constituting the base layer.

7. A touch panel according to claim 1, wherein the base layer has a thickness of 10 to 500 $\mu$m.

8. A touch panel according to claim 1, wherein the shock-absorbing layer has a thickness of 50 to 500 $\mu$m.

9. A touch panel according to claim 1, wherein a gap of 10 $\mu$m to 1 mm is provided between the cushioning member and the light conductive plate.

10. A touch panel according to claim 1, wherein the cushioning member is in contact with the light conductive plate.

* * * * *